(12) United States Patent
Walker

(10) Patent No.: US 11,516,014 B2
(45) Date of Patent: Nov. 29, 2022

(54) METHODS, SYSTEMS, AND APPARATUSES FOR CRYPTOGRAPHIC WIRELESS DETECTION AND AUTHENTICATION OF FLUIDS

(71) Applicant: Nick Walker, New York, NY (US)

(72) Inventor: Nick Walker, New York, NY (US)

(73) Assignee: Nick Walker, New York, NY (US)

( * ) Notice: Subject to any disclaimer, the term of this patent is extended or adjusted under 35 U.S.C. 154(b) by 347 days.

(21) Appl. No.: 16/901,681

(22) Filed: Jun. 15, 2020

(65) Prior Publication Data

US 2021/0391993 A1 Dec. 16, 2021

(51) Int. Cl.
*G06K 7/14* (2006.01)
*H04L 9/32* (2006.01)
(Continued)

(52) U.S. Cl.
CPC ............ *H04L 9/3226* (2013.01); *B65D 23/12* (2013.01); *B65D 43/0235* (2013.01);
(Continued)

(58) Field of Classification Search
CPC .... H04L 9/3226; H04W 12/03; H04W 12/06; B65D 23/12; B65D 43/0235;
(Continued)

(56) References Cited

U.S. PATENT DOCUMENTS

| 9,858,569 B2 | 1/2018 | Navaratnam |
| 2018/0096175 A1 | 4/2018 | Schmeling |

(Continued)

FOREIGN PATENT DOCUMENTS

| CN | 108197952 A | 6/2018 |
| CN | 109345267 A | 2/2019 |

(Continued)

OTHER PUBLICATIONS

Mooij, Desley. "What is Seal?". Medium. Feb. 20, 2018. Retrieved from: https://medium.com/sealnetwork/what-is-the-seal-network-cdebb6cf53c.

(Continued)

*Primary Examiner* — Daniel A Hess
(74) *Attorney, Agent, or Firm* — Caldwell Intellectual Property Law, LLC

(57) ABSTRACT

A system for cryptographic wireless detection and authentication of fluids includes a computing device configured to receive, from a transmitter attached to a container, a unique identifier associated with a fluid contained in the container, locate, at an immutable sequential listing, at least an identifier-specific record using the unique identifier, and a lot identifier associated with the unique identifier, retrieve, from the immutable sequential listing, at least a lot-specific record using the lot identifier, capture, from the container, at least a secondary datum describing the container, generate an authenticity probability score as a function of the at least an identifier-specific record, the at least a lot-specific record, and the at least a secondary datum, and display to a user an output based on the authenticity probability score.

20 Claims, 5 Drawing Sheets

(51) Int. Cl.
- *H04W 12/06* (2021.01)
- *G06K 7/10* (2006.01)
- *H04B 1/034* (2006.01)
- *H04B 1/06* (2006.01)
- *B65D 23/12* (2006.01)
- *B65D 51/24* (2006.01)
- *B65D 43/02* (2006.01)
- *G06N 7/00* (2006.01)
- *H04W 12/03* (2021.01)

(52) U.S. Cl.
CPC ....... *B65D 51/245* (2013.01); *G06K 7/10712* (2013.01); *G06K 7/1413* (2013.01); *G06K 7/1417* (2013.01); *G06N 7/005* (2013.01); *H04B 1/034* (2013.01); *H04B 1/06* (2013.01); *H04W 12/03* (2021.01); *H04W 12/06* (2013.01); *B65D 2203/10* (2013.01); *H04L 2209/80* (2013.01)

(58) Field of Classification Search
CPC ............. B65D 51/245; G06K 7/10712; G06K 7/1413; G06K 7/1417; G06N 7/005; H04B 1/034; H04B 1/06
USPC .......................................................... 713/168
See application file for complete search history.

(56) References Cited

U.S. PATENT DOCUMENTS

| | | | |
|---|---|---|---|
| 2018/0356341 A1* | 12/2018 | Muldoon | G01N 33/146 |
| 2019/0260573 A1* | 8/2019 | Goto | H04W 12/77 |
| 2019/0340623 A1 | 11/2019 | Rivkind et al. | |
| 2020/0005332 A1 | 1/2020 | Gadol | |
| 2020/0045538 A1 | 2/2020 | Dattawadkar | |
| 2021/0219102 A1* | 7/2021 | Gion | G06Q 20/401 |
| 2022/0084043 A1* | 3/2022 | Mickel | H04L 9/3239 |

FOREIGN PATENT DOCUMENTS

| | | |
|---|---|---|
| WO | WO2019068893 | 4/2019 |
| WO | WO2020039398 | 2/2020 |

OTHER PUBLICATIONS

Vincent, Matthew. "How smart tech could put a stop to wine fraud". Financial Times. Oct. 17, 2019. Retrieved from: https://www.ft.com/content/e9f22342-d926-11e9-9c26-419d783e10e8.

Biswas et al. "Blockchain based Wine Supply Chain Traceability System" Future Technologies Conference (FTC) (2017) Nov. 29-30, 2017 Retrieved from: https://pdfs.semanticscholar.org/7158/4b28a3885b48c6d8d644c30e57770e9681c1.pdf.

Downey, Maureen. "How Will Blockchain Technology Change Wine". Blockchain Expo (2018). Oct. 16, 2018. Retrieved from: https://www.blockchain-expo.com/2018/10/blockchain/how-willblockchain-technology-change-wine/.

* cited by examiner

US 11,516,014 B2

METHODS, SYSTEMS, AND APPARATUSES FOR CRYPTOGRAPHIC WIRELESS DETECTION AND AUTHENTICATION OF FLUIDS

FIELD OF THE INVENTION

The present invention generally relates to the field of wireless communication. In particular, the present invention is directed to wireless detection and authentication of goods using blockchain technology.

BACKGROUND

Authentication of encapsulated fluids presents unique challenges owing to the material nature of fluids and the difficulty of analysis thereof while encapsulated. Efforts to verify authenticity and lawful possession of fluids that have been employed thus far have failed to address the flexibility needed for the various situations in which such beverages change hands, nor in the formidable expertise needed to assess authenticity of the more rarified libations.

SUMMARY OF THE DISCLOSURE

In an aspect, a method of cryptographic wireless detection and authentication of fluids, the method performed by a computing device includes receiving, from a transmitter attached to a container, a unique identifier associated with a fluid contained in the container, locating, at an immutable sequential listing, at least an identifier-specific record using the unique identifier, and a lot identifier associated with the unique identifier, retrieving, from the immutable sequential listing, at least a lot-specific record using the lot identifier, capturing, from the container, at least a secondary datum describing the container. generating an authenticity probability score as a function of the at least an identifier-specific record, the at least a lot-specific record, and the at least a secondary datum, and displaying to a user an output based on the authenticity probability score.

In another aspect, a system for cryptographic wireless detection and authentication of fluids includes a computing device configured to receive, from a transmitter attached to a container, a unique identifier associated with a fluid contained in the container, locate, at an immutable sequential listing, at least an identifier-specific record using the unique identifier, and a lot identifier associated with the unique identifier, retrieve, from the immutable sequential listing, at least a lot-specific record using the lot identifier, capture, from the container, at least a secondary datum describing the container, generate an authenticity probability score as a function of the at least an identifier-specific record, the at least a lot-specific record, and the at least a secondary datum, and display to a user an output based on the authenticity probability score.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
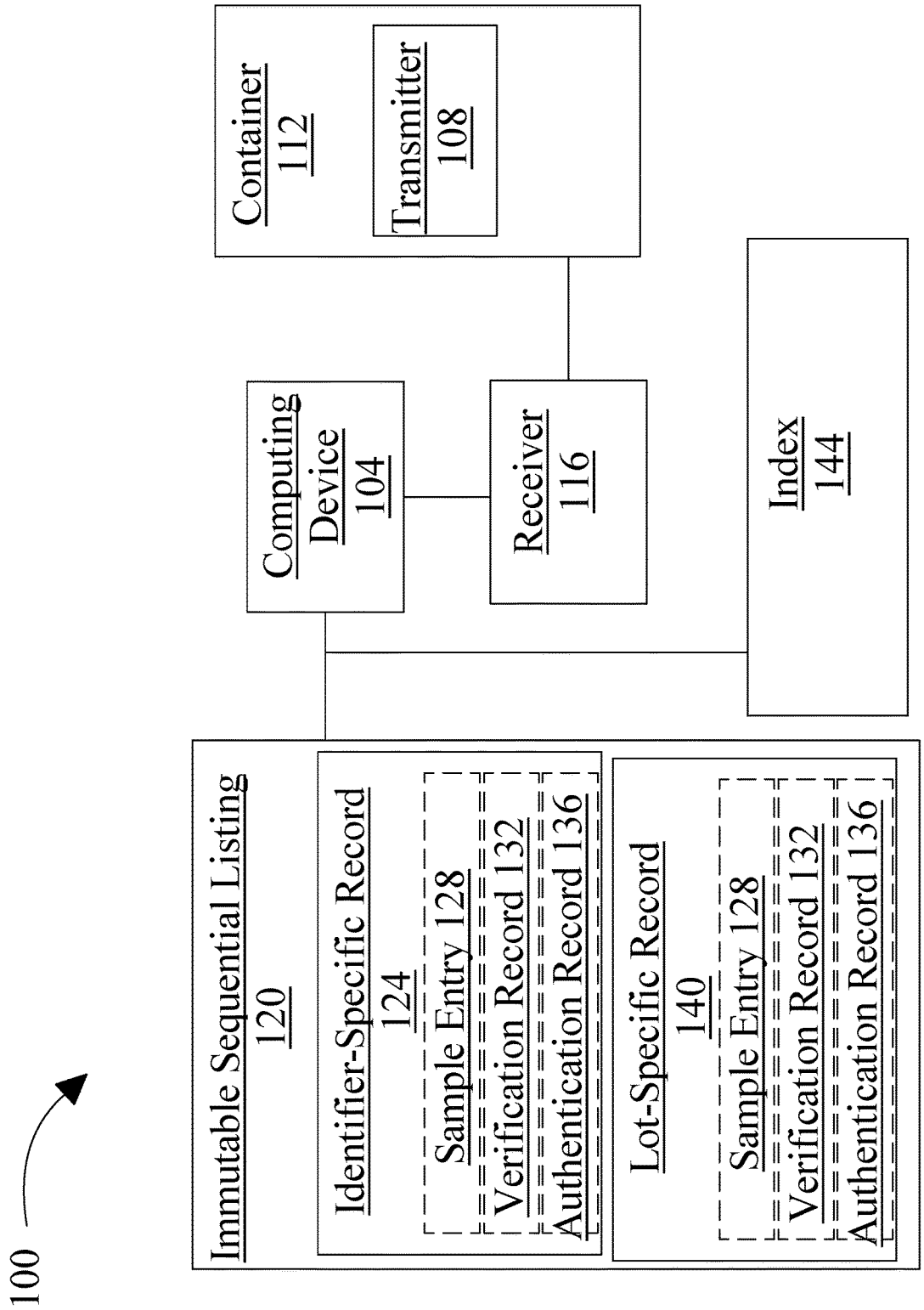
FIG. 1 is a block diagram illustrating an exemplary embodiment of a system for cryptographic wireless detection and authentication of fluids.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein use an immutable sequential listing 120, combined with wireless communication, to track movement of fluids and lots thereof, and harness resulting data and additional descriptive inputs to authenticate fluids in containers 112. A transmitter 108 may be installed in a container 112; the transmitter 108 may be installed in a stopper. Transmitter 108 may include circuitry to convert from one mode to another, including conversion from a first mode to a second mode, which may be used to indicate a corresponding change in status of the fluid in question.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described herein may generate, analyze, and/or otherwise use secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output.

Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments disclosed herein may generate, store, validate, and/or otherwise make use of digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of a system 100 for cryptographic wireless detection and authentication of fluids is illustrated. System includes a computing device 104. Computing device 104 may include any computing device 104 as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing device 104 operating in concert, in parallel, sequentially or the like; two or more computing devices 104 may be included together in a single computing device 104 or in two or more computing devices 104. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 104, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices 104 in a first location and a second computing device 104 or cluster of computing devices 104 in a second location. Computing device 104 may include one or more computing devices 104 dedicated to data storage, security, distribution of traffic for load balancing, and the like. Computing device 104 may distribute one or more computing tasks as described below across a plurality of computing devices 104 of computing device 104, which may operate in parallel, in series, redundantly, or in any other manner used for distribution of tasks or memory between computing devices 104. Computing device 104 may be implemented using a "shared nothing" architecture in which data is cached at the worker, in an embodiment, this may enable scalability of system 100 and/or computing device 104. Computing device 104 may include a user device such as mobile phone, smartphone, tablet, computer, a point-of-sale (POS) system, a special-purpose device, a server, one or more devices in the cloud, or the like. Computing device 104 may incorporate a receiver 116 as described in further detail below.

Still referring to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may communicate with a transmitter 108. Transmitter 108 may include any device that outputs a signal using electromagnetic radiation; the signal may be sent using any frequency usable in communication, including without limitation radio waves, microwaves, infrared waves, and visible light. Transmitter 108 may include an antenna. Transmitter 108 may include a passive transmitter 108, such as those used for passive radio frequency identification ("RFID") or near field communication ("NFC") tags. In some embodiments, passive transmitter 108 includes an antenna in which electric current is induced by magnetic coupling from an antenna, such as antenna of receiver 116; the induced electric current may power the passive transmitter 108, which may use additional circuitry such as a logic circuit to analyze the signal and generate a response signal. Logic circuit may be any logic circuit as described above regarding driver circuit. Transmitter 108 may output signal by modifying electromagnetic radiation using means other than an antenna. For instance, transmitter 108 may absorb and/or reflect ambient or directed electromagnetic radiation in visible or other spectra; transmitter 108 may emit and/or reflect such electromagnetic radiation in spectrally altered pattern that may be detected using a code reader, antenna, or other device or component of receiver 116.

Still referring to FIG. 1, response signal may be output by the same antenna. The response signal may be output by an additional antenna; in other words, as described above for wireless transmitter 108, antenna may include multiple antennas. In some embodiments, the passive transmitter 108 has a plurality of antennas to enable the transmitter 108 to capture the signal optimally from a plurality of angles. The signal from the interrogator may contain no information, functioning solely to activate the passive transmitter 108. In other embodiments, the signal from the interrogator contains information that circuitry in the passive transmitter 108 processes.

Continuing to refer to FIG. 1, transmitter 108 may include an active transmitter 108. Active transmitter 108 may be a transmitter 108 having a power source other than an interrogation signal; power source may be any power source as described above. Active transmitter 108 may use the antenna to broadcast a signal periodically. Active transmitter 108 may use the antenna to listen for incoming signals and transmit in response to a detected signal. Active transmitter 108 may perform both actions; for instance, active transmitter 108 may periodically transmit a first signal, and also transmit one or more second signals in response to signals transmitter 108 receives. Transmitter 108 may include a transceiver, which may be any transceiver as described above. Transmitter 108 may include a beacon using any beacon protocol as described above.

Still referring to FIG. 1, transmitter 108 may include a memory. Memory may be any memory as described below. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section.

Continuing to refer to FIG. 1, transmitter 108 may be configured to transmit a signal. Signal may be a return signal in response to a prompt by another wireless communication device, including without limitation receiver 116. Signal may be a return signal in response to interrogation by an interrogator included in another wireless communication device, including without limitation a receiver 116 as set forth in further detail below. Signal may be any wirelessly transmitted signal, including without limitation any signal transmitted through electromagnetic radiation, magnetic coupling, capacitive or other electronic coupling, or any other wireless means. In an embodiment, transmitter 108 may have, store, and/or transmit a unique identifier. Identifier may take the form of a unique identifier that uniquely corresponds to transmitter 108 for the purposes of the system 100; this may be accomplished using methods including but not limited to Globally Unique Identifiers (GUIDs), Universally Unique Identifiers (UUIDs), which may be identifiers including numbers generated according to a standard which makes the chances of another UUID or GUID being identical to the instant identifiers negligible to the point of near-certain impossibility, or by maintaining a data structure, table, or database listing all transmitter 108 identifiers and checking the data structure, table listing, or database to ensure that a new identifier is not a duplicate.

With continued reference to FIG. 1, data to be transmitted by transmitter 108 may be stored on transmitter 108 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on transmitter 108 and/or portable computing device 104.

Still referring to FIG. 1, computing device 104 may interface with transmitter 108 by means of a receiver 116. Receiver 116 may be incorporated in computing device 104, in a special-purpose device, a POS device or system, a user device such as a smartphone, mobile device, or the like, or may be a peripheral and/or may be, include, and/or be in communication with a peripheral such as an interrogator or other external antenna. Receiver 116 may include a camera or other optical capture device.

Continuing to refer to FIG. 1, receiver 116 may have an antenna. Receiver 116 may include a wireless interrogator; in other words, the antenna may be capable of inducing a current in an antenna of a passive transmitter 108 through magnetic coupling, capacitive coupling, or other means. Receiver 116 may be able to receive the signal transmitted by one or more transmitters 108 as described below using the antenna. In some embodiments, the receiver 116 can transmit as well as receive signals. Receiver 116 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Wash. Transceiver may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna may include a plurality of antennas; for example, and without limitation, antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, receiver 116 may include both an antenna for receiving from and/or transmitting signals to a transmitter 108 and a transceiver that may be used for communicating with a mobile computing device 104, for instance as described below. Receiver 116 may include any device capable of or configured to receive any signal in the form of electromagnetic radiation, including without limitation visible spectrum light, infrared light, radio waves, or signals in any other portion of the electromagnetic spectrum, capacitive or magnetic inductance, or any other form of wireless communication that may be established between two electronic devices or components. Receiver 116 may alternatively or additionally include an optical scanning device, which may, for instance, extract any data that may be received from transmitter 108 from an optically scannable code, including without limitation a quick-read (QR) code, a universal product code (UPC), a bar code, or the like.

Still referring to FIG. 1, computing device 104 may communicate with, authenticate, store all or a portion of, or otherwise interact with an immutable sequential listing 120, for instance as described in further detail below. An "immutable sequential listing 120," as used in this disclosure, is a data structure that places data entries in a fixed sequential arrangement, such as a temporal sequence of entries and/or blocks thereof, where the sequential arrangement, once established, cannot be altered or reordered. An immutable sequential listing 120 may be, include and/or implement an immutable ledger, where data entries that have been posted to the immutable sequential listing 120 cannot be altered.

Figure 2:
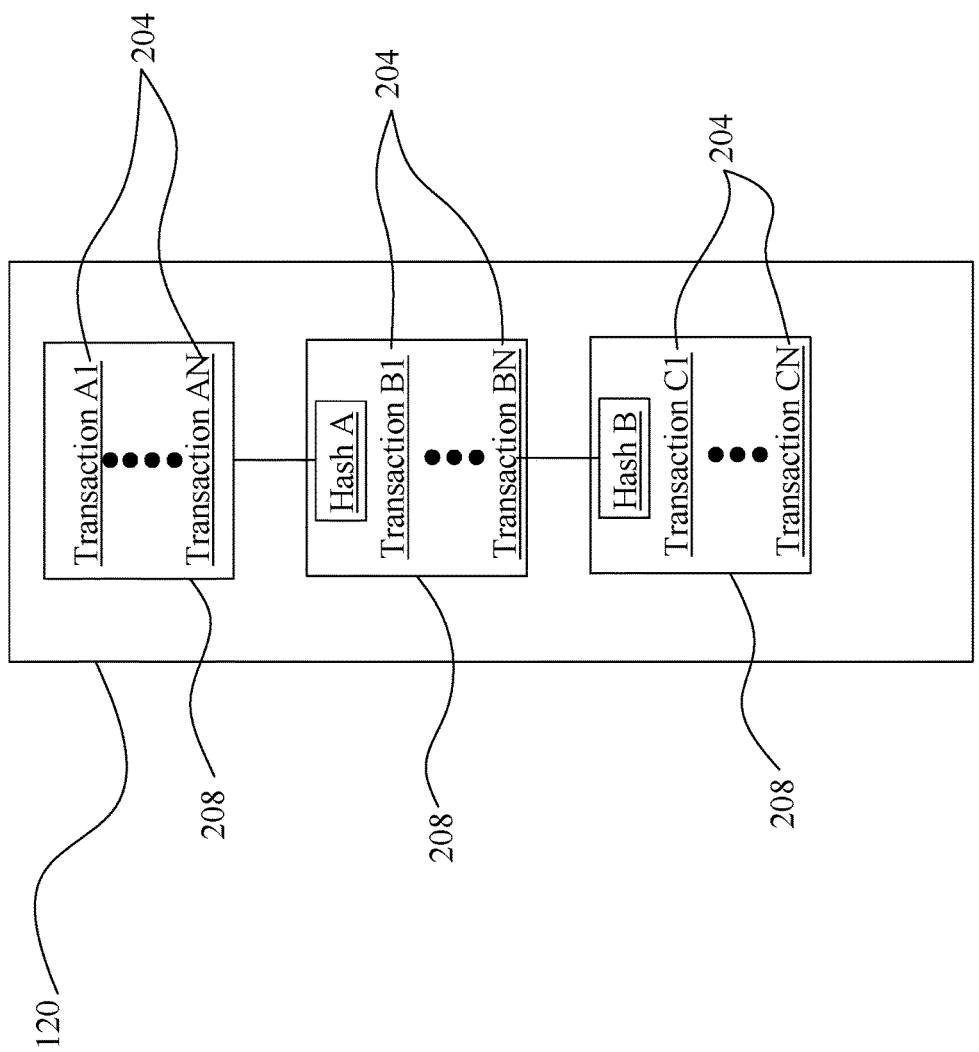
FIG. 2 illustrates an exemplary embodiment of an immutable sequential listing 120.

Referring now to FIG. 2, an exemplary embodiment of an immutable sequential listing 120 is illustrated. Data elements may be listed in immutable sequential listing 120; data elements may include any form of data, including textual data, image data, encrypted data, cryptographically hashed data, and the like. Data elements may include, without limitation, one or more at least a digitally signed assertions. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as crypto currency as described below. The virtual currency may be a digital currency. Virtual currency may include quasi-currency useable for instance within a single corporate entity or other firm or organization, such as airline miles, credit card points, or the like. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 204 may describe the transfer of a physical good; for instance, a digitally signed assertion 204 may describe the sale of a product. In some embodiments, a transfer nominally of one item may be used to represent a transfer of another item. For instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, protocols promulgated by LUKSO of Berlin, Germany, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. Address may be a representation, such as a hash, of the public key. Address may be linked to the public key in memory of a computing device 104, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. A digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below. Alternatively or additionally, address may include and/or be associated with a unique identifier as described above, for instance and without limitation by inclusion of a hash or other data element generated from unique identifier and/or by association, in any data structure, of unique identifier with a public key and/or with address.

In an embodiment, and still referring to FIG. 2 immutable sequential listing 120 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 120 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 120 may preserve the order in which the at least a posted content took place by listing them in chronological order; alternatively or additionally, immutable sequential listing 120 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 120 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 120 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 120, once formed, may be inalterable by any party, no matter what access rights that party possesses. For instance, immutable sequential listing 120 may include a hash chain, in which data is added during a successive hashing process to ensure non-repudiation. Immutable sequential listing 120 may include a block chain. In one embodiment, a block chain is immutable sequential listing 120 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device 104 may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 120 to take a powerful set of computing devices 104 a certain period of time to produce. Where one sub-listing 208 takes less time for a given set of computing devices 104 to produce the sub-listing 208 protocol may adjust the algorithm to produce the next sub-listing 208 so that it will require more steps; where one sub-listing 208 takes more time for a given set of computing devices 104 to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 120 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 120 may develop a fork; protocol may determine which of the two alternate branches in the fork is the valid new portion of the immutable sequential listing 120 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 120 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 120.

Still referring to FIG. 2, additional data linked to at least a posted content may be incorporated in sub-listings 208 in the immutable sequential listing 120; for instance, data may be incorporated in one or more fields recognized by block chain protocols that permit a person or computer forming a at least a posted content to insert additional data in the immutable sequential listing 120. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency may be traded as a crypto currency, as a token such as an OXT or Vechain token, or in any other suitable form. In one embodiment, a crypto currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto currency may be centralized, with its protocols enforced or hosted by a particular entity. For instance, crypto currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new crypto currency to the miners. Quantities of crypto currency may be exchanged using at least a posted content as described above.

Referring again to FIG. 1, immutable sequential listing 120 may include a plurality of records as described in further detail below. For instance, and without limitation, immutable sequential listing 120 may include a plurality of identifier-specific records 124, where an "identifier-specific record" is defined for purposes of this disclosure as a record containing a unique identifier of a transmitter 108 as described above; identifier-specific record 124 may include further data concerning transmitter 108, history of transmitter 108, fluid contained in a container 112 attached to transmitter 108, or the like. In an embodiment, an identifier-specific record 124 may be created any time a process is performed as described below in reference to FIG. 4 and/or any time container 112 changes possession and/or transaction or transfer of container 112 of fluid occurs; upon each such occurrence, a user and/or device operated by a user may post a digitally signed assertion recording transfer. Digitally signed assertion, upon transfer of possession, may be signed by a private key belonging to a previous possessor and may sign an address associated with a new possessor; examples include without limitation receipt in shipment, transfer to a shipment entity, wholesale and/or retail sale, after-market sale, auction, transfer as a gift, or the like. Each person and/or device operated thereby, upon entry of such a record, may be given an incentive and/or reward, such as a balance of points, or increase in such a balance, which may be redeemed for discounts, cash value, gift certificates or the like; incentive may alternatively be in the form of incremental increases in virtual currency as described above. An identifier-specific record 124 may include, without limitation, sample entry 128, defined for the purposes of this disclosure as a description of any process whereby fluid in container 112 is inspected by a person, which may include without limitation visual inspection, assessment of aroma, assessment of taste, assessment of mouthfeel, and/or overall assessment, as well as comparison to descriptions and/or past samples from lot or of related beverages in other sample entries. Sample entry 128 may include an expert sample entry 128, which may be performed by an expert in sampling fluid, such as a kind, brand, category, lot or the like of alcoholic beverage; expert may have a credential with which to generate a digital signature identifying expert, such as a private key, with which an expert sample entry 128 may be signed. An identifier-specific record 124 may include, without limitation, a verification record 132, which is defined for the purposes of this disclosure as a record recording a verification of a path within immutable sequential listing 120, as set forth in further detail below. An identifier-specific record 124 may include, without limitation, an authentication record 136 defined for purposes of this disclosure as any determination of a probability of authenticity, and/or determination of authenticity, as described in further detail below. Any record may be included, for purposes of this disclosure, if the record itself is included and/or if a hash, Merkle tree, or other cryptographic accumulator of the record is included.

In an embodiment, and still referring to FIG. 1, system 100 may store any or all records that may be stored in immutable sequential listing 120, including without limitation digitally signed assertions, in an alternative or additional datastore; datastore may be used in addition to immutable sequential listing and/or instead of immutable sequential listing. Datastore may be implemented, without limitation, as a relational database, a key-value retrieval datastore such as a NOSQL database, or any other format or structure for use as a datastore that a person skilled in the art would recognize as suitable upon review of the entirety of this disclosure. Datastore may alternatively or additionally be implemented using a distributed data storage protocol and/or data structure, such as a distributed hash table or the like. Datastore may include a plurality of data entries and/or records as described above. Data entries in a datastore may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a datastore may store, retrieve, organize, and/or reflect data and/or records as used herein, as well as categories and/or populations of data consistently with this disclosure.

With continued reference to FIG. 1, immutable sequential listing 120 may include a lot-specific record 140 which is defined for the purposes of this disclosure as a record describing a physical good to which systems as described in this disclosure may be providing anti-counterfeit protection; physical good may include a batch of fluid, such as a batch of distilled liquor, a set of bottles from a given barrel of wine, a batch of containers 112 brewed and/or fermented together, or the like. Lot-specific record 140 may include a sample entry 128, which may include an expert sample entry 128, as performed on any sample of lot and/or containers 112 therein, a verification record 132 regarding any containers 112 in lot, an authentication record 136 regarding containers 112 in lot, and/or product data. Product data may include product information as well as lot-specific or bottle-specific information such as vintage, a case in which a bottle was packaged, shipped, or the like, an identity of an individual bottle, one or more quality ratings, and/or authenticity data. Data may include data describing vineyards, grapes, tasting notes, oak and/or other wood used for aging, and/or other manufacturing details.

Still referring to FIG. 1, system 100 may include an index 144, defined as a data structure relating key elements of data such as unique identifiers and/or lot identifiers to locations such as blocks and/or sub listings in immutable sequential listing 120, to verification records 132 and/or to authentication records 136. Index 144 may be linked to storage within immutable sequential listing 120 and/or storage in a database such as a relational database, key-value database such as a NOSQL database, a distributed hash table, or any other data structure that may occur to a person skilled in the art upon reviewing the entirety of this disclosure.

Figure 3:
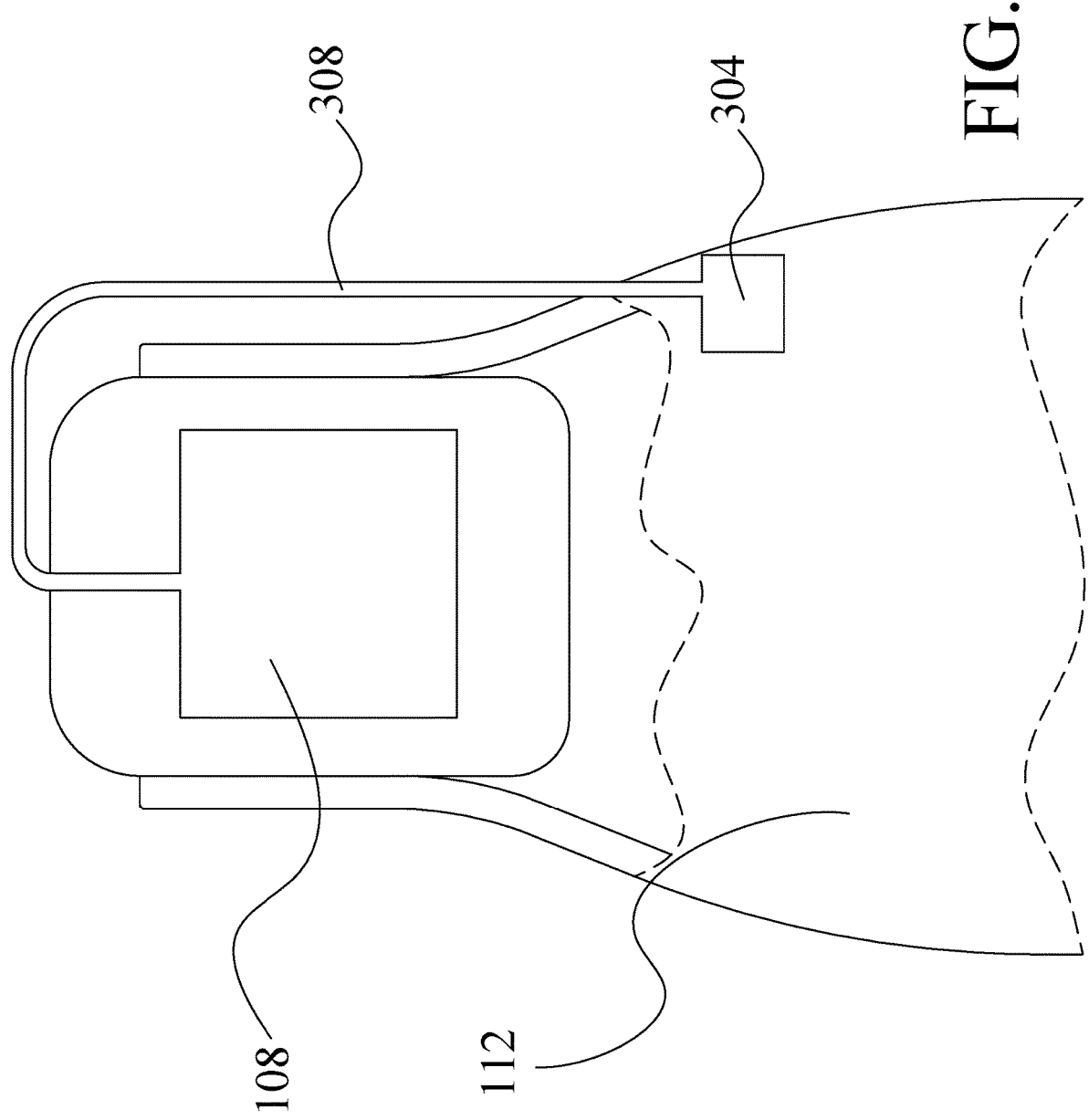
FIG. 3 is a schematic diagram of an exemplary embodiment of a transmitter 108 attached to a container 112.

Referring now to FIG. 3 an exemplary embodiment of a transmitter 108 attached to a container 112 is illustrated for exemplary purposes. Container 112 contains a fluid; container 112 may contain an alcoholic beverage, such as wine, port, sherry, beer, mead, distilled liquors such as Cognac, whiskey, whisky, bourbon, Pisco or the like, liqueurs such as herbal liqueurs, blended beverages, or the like. Container 112 may include a bottle, which may be closed with a stopper, such as a cork or other object inserted into a mouth of a bottle to seal it. Transmitter 108 may be contained within the stopper. In an embodiment, transmitter 108 may be attached to a tamper circuit 304; a "tamper circuit" is defined for the purposes of this disclosure as a circuit that causes transmitter 108 to be permanently altered upon detachment from tamper circuit 304. In in embodiment transmitter 108 may have a first mode in which the transmitter 108 generates a unique identifier in a first form and a second mode in which the transmitter 108 generates the unique identifier in a second form; for instance, transmitter 108 in first mode may perform a single mathematical operation on identifier that is not performed in second mode, such that output of identifier may be generated differently in first mode than in second mode. System 100 may have records indicative of each identifier, such that computing device 104 and/or other elements of system 100 may be able to determine which mode transmitter 108 is in. Alternatively or additionally, transmitter 108 may be rendered inoperable by removal of tamper circuit 304. Tamper circuit 304 may be attached to a body of container 112 via adhesion, by looping a conductive wire 308 about a neck of container 112, adhering the conductive wire 308 to the container, or the like. In an embodiment, and by way of a non-limiting example, tamper circuit 304 may contain logic providing a logical output directing transmitter 108 to transmit in first mode, such that severing a connection between transmitter 108 and tamper circuit 304 prevents that logical output from being input to the transmitter 108. Alternatively, removal of tamper circuit 304 may trigger an alarm signal to be transmitted, and/or may render transmitter 108 inoperable by opening a circuit needed to power transmitter 108.

Still referring to FIG. 3, transmitter 108 may be configured to transmit unique identifier directly; alternatively or additionally transmitter 108 may be configured to sign a digital signature using unique identifier. For instance, a receiver 116 and/or computing device 104 may transmit a message, challenge, or other element of data to transmitter 108, which may sign it using unique identifier; records "containing" unique identifier as described herein may include records containing digital signatures signed by unique identifier. Index 144 may contain a link between such records and a uniform index 144ing datum which may differ from a secret in transmitter 108 used to sign signatures. Unique identifier may be unique, for such embodiments, where it is used to perform a digital signature that no other device is configured to perform.

Figure 4:
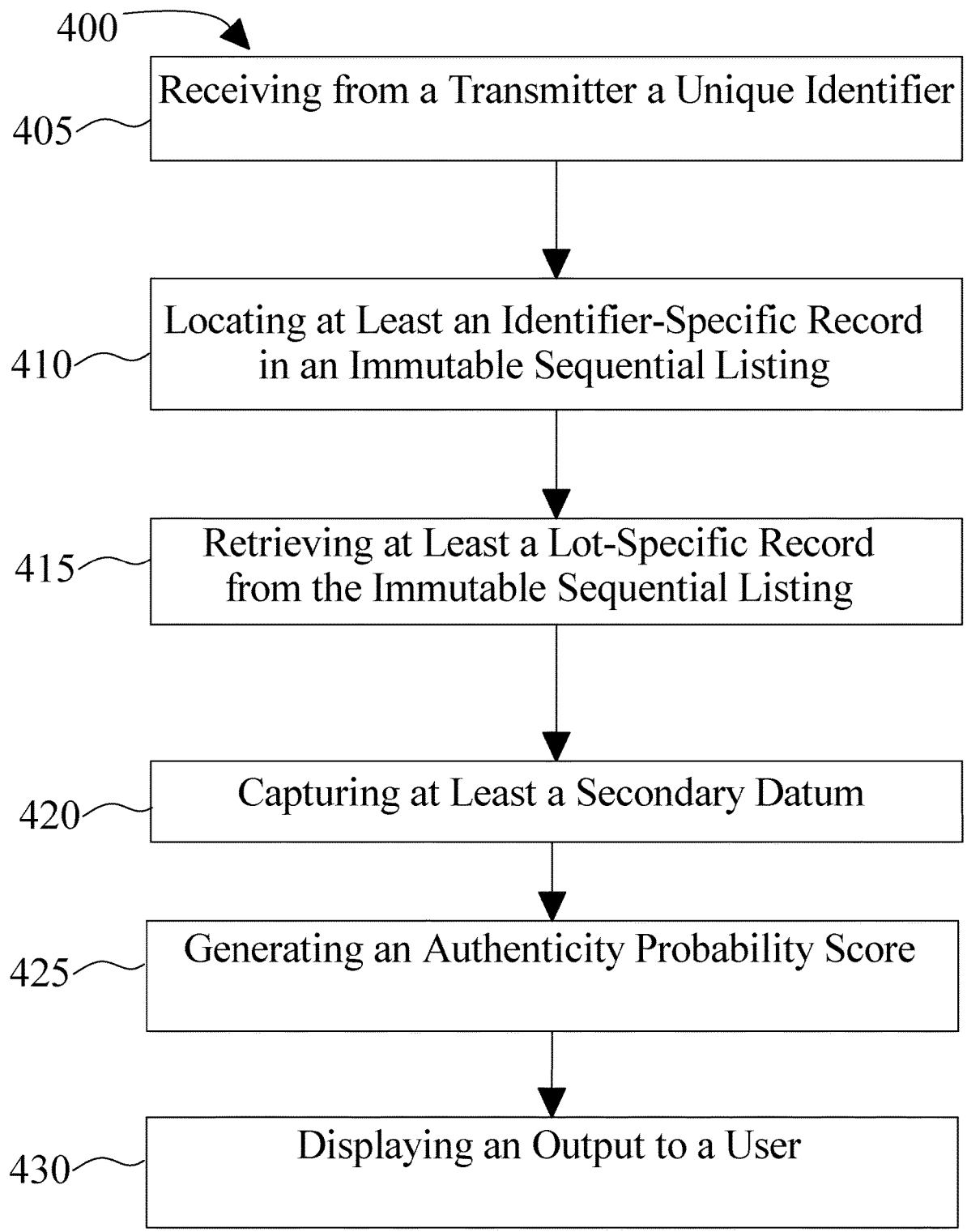
FIG. 4 is a flow diagram illustrating an exemplary embodiment of a method of cryptographic wireless detection and authentication of fluids.

Referring now to FIG. 4, an exemplary embodiment of a method 400 of wireless detection and authentication of goods using blockchain technology is illustrated. At step 405, computing device 104 receives, from a transmitter 108 attached to a container 112, a unique identifier associated with a fluid contained in the container 112; this may be implemented, without limitation, as described above in reference to FIGS. 1-3. Embodiments of method 400 may be performed via a user device, over a network, for instance by providing an "app" or web application to a user mobile device, which may activate an NFC chip in the phone to scan the transmitter 108. Container 112 may include a stopper. Transmitter 108 may be contained within the stopper. Transmitter 108 may be attached to a tamper circuit 304. Transmitter 108 may have first mode in which the transmitter 108 generates the unique identifier in a first form and a second mode in which the transmitter 108 generates the unique identifier in a second form; computing device 104 may interpret first mode as indicating a status in which container 112 has not yet been opened and/or unsealed for the first time. Computing device 104 may interpret second mode as indicating that the container 112 has been unsealed, which may occasion a different process for authentication as described in further detail below. As a non-limiting example, and as described for instance in connection with FIG. 3 above, transmitter 108 may include a tamper-evident circuit; detachment of the transmitter 108 from the tamper-evident circuit causes the transmitter 108 to transition from first mode to second mode. As a further non-limiting example, container 112 may include a body and a stopper inserted in the body, transmitter 108 may be contained within the stopper, and tamper-evident circuit may be attached to the body. Computing device 104 may determine whether unique identifier is in first form or second form and identify a mode of first mode and second mode based on the determination; in other words, computing device 104 may determine the current mode of the transmitter 108.

At step 410, and still referring to FIG. 1, computing device 104 may locate, at an immutable sequential listing 120, at least an identifier-specific record 124 using the unique identifier, and a lot identifier associated with the unique identifier. Locating at least an identifier-specific record 124 may include generating an index 144 linking unique identifiers to locations within the immutable sequential listing 120. In an embodiment, each time any record in immutable sequential listing 120 is generated, computing device 104 and/or another device in system 100 may create an entry in index 144 linking that record to one or more key values, as described above. Computing device 104 may locate at least an identifier-specific record 124 by retrieving a plurality of locations within the immutable sequential listing 120 containing the unique identifier in an index 144 linking unique identifiers to locations within the immutable sequential listing 120. Computing device 104 may retrieve identifier-specific records 124, lot-specific records 140, and/or other records from any or all of plurality of locations. Additional locations, which may or may not be include in plurality of locations, may include locations within a database operated by a supplier or other party and/or device.

In an embodiment, and still referring to FIG. 4, computing device 104 may validate each identifier-specific record 124 by validating an entire chain to a genesis sub-listing or block. Alternatively or additionally, computing device 104 may perform a probabilistic sampling process, in which a portion of a chain between records in immutable sequential listing 120 is validated and/or verified by evaluating validity of hashes and digital signatures of digitally signed assertions between a first location having a first record and a second location having a second record. For instance and without limitation, computing device 104 select a first location and a second location from the plurality of locations and verifying a path in the immutable sequential listing 120 from the first location to the second location. Computing device 104 may select first location and the second location randomly, where "randomly" signifies pseudorandom and/or random selection, for instance by enumerating locations, generating and/or receiving a random and/or pseudorandom number, and selecting a matching index 144. Computing device 104 may record a result of the verifying in index 144 and/or in immutable sequential listing 120, for instance, recording in immutable sequential listing 120 may include entering in the immutable sequential listing 120 a digitally signed assertion that includes result of verifying. A user for whom result of verifying is recorded may receive an incentive and/or reward, such as a balance of points, or increase in such a balance, which may be redeemed for discounts, cash value, gift certificates or the like; incentive may alternatively be in the form of incremental increases in virtual currency as described above.

With continued reference to FIG. 4, computing device 104 may retrieve at least a verification record 132 from the index 144 using the unique identifier; at least a verification record 132 may contain a past verification of a path between two locations containing the unique identifier in the immutable sequential listing 120, for instance as performed by a previous computing device 104. In an embodiment, computing device 104 may use such retrieved verification record 132 as part of authenticity calculation as described below. Computing device 104 may determine whether there already exists a verification record 132 between a first location and a second location; where such a record exists, computing device 104 may select a different first location and/or second location, including without limitation via random selection, to verify. In an embodiment, this may help to ensure that multiple devices performing process steps as described herein may combine to validate an entire chain containing such locations and/or a substantial portion thereof.

Still referring to FIG. 4, at least an identifier-specific record 124 may include stock-keeping unit (SKU) data and/or other visually scannable data associated with fluid, one or more elements of label, a shape, and/or color of container 112, a name of a product, a date and/or vintage of production, a lot identifier, and/or any other element of data usable to make determinations of probability of authenticity and/or probability of authenticity. At least an identifier-specific record 124 may include one or more geographic locations where container 112 has been recorded as being located, such as a location of a current owner and/or merchant. Persons engaging with system 100 to update geographic data may receive an incentive and/or reward, such as a balance of points, or increase in such a balance, which may be redeemed for discounts, cash value, gift certificates or the like; incentive may alternatively be in the form of incremental increases in virtual currency as described above. At least an identifier-specific record 124 further comprises an institutional location, defined for purposes of this disclosure as an identity of a store, company, merchant, person, or other entity selling the fluid; persons entering or causing devices operated by them to enter such records may receive an incentive and/or reward, such as a balance of points, or increase in such a balance, which may be redeemed for discounts, cash value, gift certificates or the like; incentive may alternatively be in the form of incremental increases in virtual currency as described above.

Continuing to refer to FIG. 4, identifier-specific record 124 may include a sample, which may, for instance, be recorded after a record indicative of transition from first mode to second mode; for instance an expert or other person may have sampled after unsealing at some point to verify that the contents have not been changed, or to determine that they have, which may indicate that contents of container 112 are no longer authentic. Expert or other person performing such a sample may sign a digitally signed assertion containing sample using a private key belonging to expert or other person. Such experts and/or participants may receive an incentive and/or reward, such as a balance of points, or increase in such a balance, which may be redeemed for discounts, cash value, gift certificates or the like; incentive may alternatively be in the form of incremental increases in virtual currency as described above. Portable computing device 104 may receive lot identifier by finding lot identifier in at least an identifier-specific record 124.

At step 415, and still referring to FIG. 4, portable computing device 104 may retrieve, from immutable sequential listing 120, at least a lot-specific record 140 using the lot identifier. Retrieving the at least a lot-specific record 140 may include retrieving, in an index 144 linking lot identifiers to locations within the immutable sequential listing 120, a plurality of locations within the immutable sequential listing 120, where each location of the plurality of locations contains the lot identifier; this may be performed, without limitation, as described above for using index 144 to locate identifier-specific record 124. Computing device 104 may select a first location and a second location from the plurality of locations and verify a path in the immutable sequential listing 120 from the first location to the second location; two points may be selected for a unique identifier associated with lot identifier. First location and second location may be selected randomly. Computing device 104 may recording a result of verifying in index 144 immutable sequential listing 120, and/or another data structure as described above. Verification and/or recording thereof may result in conferring upon a user of computing device 104 and/or a user device enacting one or more portions of process an incentive and/or reward, such as a balance of points, or increase in such a balance, which may be redeemed for discounts, cash value, gift certificates or the like; incentive may alternatively be in the form of incremental increases in virtual currency as described above.

With continued reference to FIG. 4, at least a lot-specific record 140 may include at least an expert sample entry 128 as described above; expert sample entry 128 may be used to indicate common tasting notes and other information usable to identify, for instance, an alcoholic beverage contained in container 112. At least a lot-specific record 140 may include geographic distribution data, which may list one or more locations to which elements of lot may have been shipped and/or distributed, as entered by other users of system 100 and/or devices operated thereby. Such users may receive, in response to entering geographic distribution data, an incentive and/or reward, such as a balance of points, or increase in such a balance, which may be redeemed for discounts, cash value, gift certificates or the like; incentive may alternatively be in the form of incremental increases in virtual currency as described above.

Still referring to FIG. 4, at least a lot-specific record 140 further comprises previous authenticity data and/or previous verification data; previous authenticity data may include any output of any previous authenticity probability determinations and/or other determinations regarding authenticity as described below. Previous verification data may include any result of any previous verification as described above. Persons entering such previous authenticity data and/or previous verification data and/or having devices operated by them making such entries may receive an incentive and/or reward, such as a balance of points, or increase in such a balance, which may be redeemed for discounts, cash value, gift certificates or the like; incentive may alternatively be in the form of incremental increases in virtual currency as described above.

At step 420, and further referring to FIG. 4, computing device 104 captures, from the container 112, at least a secondary datum describing the container 112. At least a secondary datum describing the container 112 may include any element of data that is captured or entered without using data from transmitter 108. For instance, at least a secondary datum may include a label datum, which may include without limitation a user description of a label on container 112 or one or more portions thereof, a picture captured by a user device, receiver 116, and/or computing device 104, or the like. At least a secondary datum describing the container 112 may include an optically scanned datum such as a SKU code, quick read (QR) code, or the like. At least a secondary datum may include a current geographic location and/or a current institutional location of container 112; for instance, and without limitation, a user device, receiver 116, and/or other computing device 104 proximate to transmitter 108, such as without limitation a device in communication with transmitter 108, may determine its location using navigational facilities that determine location based on contact with Global Positioning System (GPS), cell-tower triangulation, and/or connection to one or more local wireless networks and/or wi-fi hotspots.

At step 425, computing device 104 generates an authenticity probability score as a function of the at least an identifier-specific record 124, the at least a lot-specific record 140, and the at least a secondary datum. An "authenticity probability score," as used in this disclosure, is a numerical quantity indicating a likelihood and/or probability, for instance as expressed as a fraction of 1, a percentage, or the like, that a fluid contained in container 112, such as an alcoholic beverage, is authentic. Probability may be set according to one or more combinations of data available from transmitter 108, at least an identifier-specific record 124, at least a lot-specific record 140, and at least a secondary datum. For instance, if current geographic location matches a predicted geographic location based on at least an identifier-specific record 124 and/or a geographic region specified in at least a lot-specific record 140, that may increase score, while failure to match either may decrease score. An SKU, name, bottle shape, and/or label matching at least an identifier-specific record 124 and/or at least a lot-specific record 140 may increase authenticity probability score, while failure to match may decrease authenticity probability score.

Still referring to FIG. 4, computing device 104 may use one or more additional factors to compute authenticity probability score. For instance, an indication that transmitter 108 is in first mode may increase authenticity probability score compared to indication that transmitter 108 is in second mode, as the latter indicates it is more probable that container 112 has been opened, and contents may have been adulterated, removed, and/or otherwise modified. Generating authenticity probability score may include retrieving at least a verification record 132 and/or at least an authentication record 136 from index 144, at least an identifier-specific record 124, and/or at least a lot-specific record 140 and generating the authenticity probability score as a function of the at least a verification record 132. For instance, and without limitation, if a past authenticity probability score identifier was at a certain level, this may be used as a default score from which further calculations may deviate to increase and/or decrease authenticity probability score. As a further example, computing device 104 may calculate an average authenticity probability score calculated for other containers 112 associated with lot identifier and use that as a default score from which further calculations may deviate to increase and/or decrease authenticity probability score. Past verification failures for identifier and/or lot may be used to calculate a lower authenticity probability score.

At step 430, and continuing to refer to FIG. 4, computing device 104 displays to a user an output based on the authenticity probability score. In an embodiment, computing device 104 may display authenticity probability score directly. In another embodiment, computing device 104 may measure authenticity probability score against a preconfigured threshold, and display an output resulting from the measurement to the user. Threshold may, for instance be a number that authenticity score may exceed to render a conclusion of authenticity, such as a percentage authenticity score in a percentage form must exceed; as a non-limiting example, computing device 104 may determine fluid, a container of fluid, a product, and/or any other good and/or item to be authenticated and/or analyzed according to process steps as described herein is authentic where authenticity score exceeds 90 percent or equivalent. In an embodiment, there may be multiple thresholds, such as a high threshold occasioning a determination of authenticity and a lower threshold below which computing device 104 flags fluid as inauthentic. Threshold may be raised (meaning for purposes of this disclosure requiring a greater probability of authenticity) and/or lowered (indicating a requirement of a lesser probability of authenticity), depending on one or more elements of data described above. For instance, threshold may be set as a function of a verification records 132, where as a non-limiting example verification records 132 indicating past verification failures relating to identification-specific records may greatly increase threshold and verification failures relating to other unique identifiers associated with lot identifier may occasion a lesser increase in threshold; verification records 132 indicating past successful verifications relating to identification-specific records may greatly decrease threshold and successful verifications relating to other unique identifiers associated with lot identifier may occasion a lesser decrease in threshold. Threshold may alternatively or additionally be set as a function of authentication records 136, where as a non-limiting example verification records 132 indicating past authentication failures relating to identification-specific records may greatly increase threshold and authentication failures relating to other unique identifiers associated with lot identifier may occasion a lesser increase in threshold; authentication records 136 indicating past successful authentications relating to identification-specific records may greatly decrease threshold and successful authentications relating to other unique identifiers associated with lot identifier may occasion a lesser decrease in threshold. Threshold may alternatively or additionally be set as a function of transmitter 108 mode, where first mode may be associated with a lower threshold than second mode. In an embodiment, failure of authenticity score to meet threshold may result in a determination that fluid in container 112 is inauthentic; this may prompt a message to user that fluid in container 112 is inauthentic. Alternatively or additionally, an authenticity probability score below a threshold may cause computing device 104 to generate a message calling for additional proof and/or assessment of authenticity, such as without limitation a novel sample by an expert.

Still referring to FIG. 4, computing device 104 may generate an authentication result as a function of the authentication record 136 and record the authentication result in the immutable sequential listing 120 and/or index 144; authentication result may include without limitation authenticity probability score, elements of data that were used to generate authentication probability score, a threshold comparison result, a threshold level used, factors used to compute threshold level, or the like. A user of computing device 104 and/or a user device participating in process 400 may receive in exchange for posting authentication result an incentive and/or reward, such as a balance of points, or increase in such a balance, which may be redeemed for discounts, cash value, gift certificates or the like; incentive may alternatively be in the form of incremental increases in virtual currency as described above.

In an embodiment, and still referring to FIG. 4, computing device 104 may receive a novel sample entry 128. In an embodiment, novel sample entry 128 may include any sample entry 128 as described above, where sample entry 128 is received after determination of authenticity probability score as described above; temporal order of events may established by recording of sample entry 128 later in an order imposed by immutable sequential listing 120, and/or using a secure timestamp established using a time stamping authority, for instance and without limitation as described in the RFC 3161 standard for trusted timestamps, or in the ANSI ASC x9.95 standard. Novel sample entry 128 may include a determination by one or more experts as to the likely authenticity of a fluid, such as an alcoholic beverage, contained in container 112. Novel sample entry 128 may include an identity and/or one or more professional credentials of an expert that performed the sample, which may include without limitation visual inspection, assessment of aroma, assessment of taste, assessment of mouthfeel, and/or overall assessment, as well as comparison to descriptions and/or past samples from lot or of related beverages by the same expert. Novel sample entry 128 may include an expert score indicative of likelihood of authenticity and/or an expert conclusion that the beverage is or is not authentic. Novel sample entry 128 may be digitally signed using a private key belonging to expert. Computing device 104 may generate an authentication result as a function of the novel sample entry 128; for instance, if expert concludes that a fluid contained in container 112 is authentic, computing device 104 may generate an authentication result indicating authenticity, which may be displayed to user. Alternatively or additionally, computing device 104 may calculate a new authenticity probability score, for instance with expert input included as a new factor to increase and/or decrease authenticity probability score; increase or decrease may be weighted according to a degree of probability of authenticity provided by expert and/or with a factor reflecting the expert's degree of expertise relative to the type of beverage, the maker of the beverage, and/or the lot. Factor reflecting expert's degree of expertise may be entered by one or more additional experts in immutable sequential listing 120 and/or index 144. Alternatively or additionally, computing device 104 may modify previously determined authenticity probability score and/or a threshold as a function of the novel sample entry 128, where modification may be performed according to any process and/or procedure described above for calculation of threshold level and/or authentication score. An expert entering novel sample entry 128 may receive an incentive and/or reward, such as a balance of points, or increase in such a balance, which may be redeemed for discounts, cash value, gift certificates or the like; incentive may alternatively be in the form of incremental increases in virtual currency as described above.

Still referring to FIG. 4, computing device 104 may generate a new identifier-specific record 124 and/or lot-specific record 140 upon completion of any or all process steps as described above. Computing device 104 may alternatively or additionally generate a new identifier-specific record 124 and/or lot-specific record 140 upon subsequent and/or concurrent performance of a transfer of possession, such as a purchase by a user operating computing device 104, receiver 116, and/or system. Digitally signed record may include, without limitation, unique identifier, lot identifier, and/or any other element of data used in process as described above, as well as metadata such as location, time, merchant, a type of transaction such as a purchase (wholesale or retail), a type transfer of possession from one party to another, or the like Generation of digitally signed record may cause user to receive an incentive and/or reward, such as a balance of points, or increase in such a balance, which may be redeemed for discounts, cash value, gift certificates or the like; incentive may alternatively be in the form of incremental increases in virtual currency as described above.

Further referring to FIG. 4, incentives may aggregated over time; for instance, a user may have an incentive balance that may be incremented every time user performs an action as described above that generates an incentive. Additional aggregate and/or cumulative incentives may be generated, for instance for durations of interaction with and/or membership in system 100, frequency of interactions with system, number of participations in method steps as described above, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
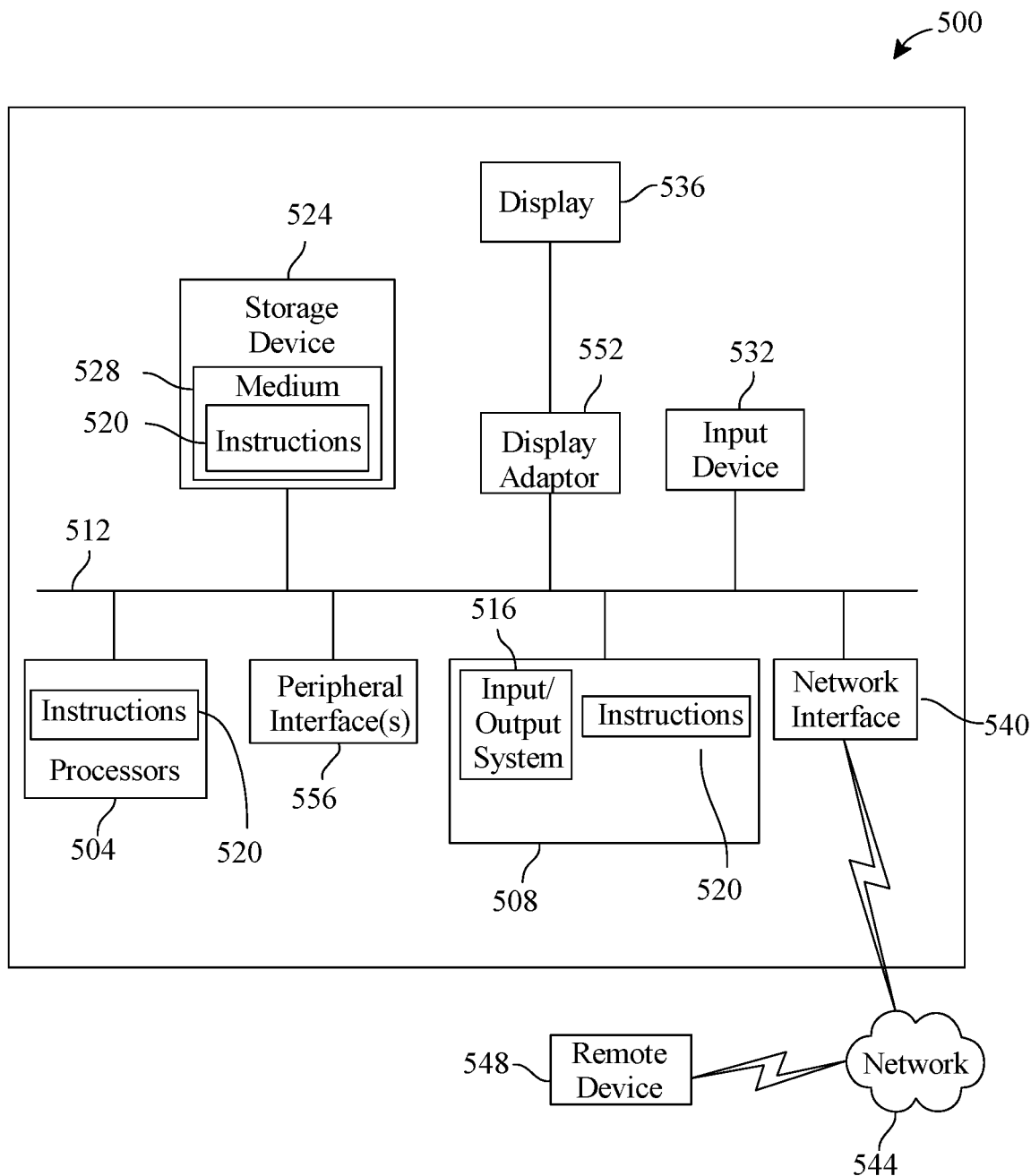
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Processor 504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 504 may be organized according to Von Neumann and/or Harvard architecture as a non-limiting example. Processor 504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 532. In one example, a user of computer system 500 may enter commands and/or other information into computer system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of cryptographic wireless detection and authentication of fluids, the method performed by a computing device, the method comprising:
   receiving, from a transmitter attached to a container, a unique identifier associated with a fluid contained in the container;
   locating, at an immutable sequential listing, at least an identifier-specific record using the unique identifier, and a lot identifier associated with the unique identifier;
   retrieving, from the immutable sequential listing, at least a lot-specific record using the lot identifier;
   capturing, from the container, at least a secondary datum describing the container;
   generating an authenticity probability score as a function of the at least an identifier-specific record, the at least a lot-specific record, and the at least a secondary datum; and
   displaying to a user an output based on the authenticity probability score.

2. The method of claim 1, wherein the container further comprises a stopper, and the transmitter is contained within the stopper.

3. The method of claim 1, wherein the transmitter has a first mode in which the transmitter generates the unique identifier in a first form and a second mode in which the transmitter generates the unique identifier in a second form.

4. The method of claim 3, wherein the transmitter further comprises a tamper circuit, and wherein detachment of the transmitter from the tamper circuit causes the transmitter to transition from first mode to second mode.

5. The method of claim 3 further comprising:
   determining whether the unique identifier is in the first form or the second form; and
   identifying a mode of first mode and second mode based on the determination.

6. The method of claim 1, wherein locating the at least an identifier-specific record further comprises retrieving, in an index linking unique identifiers to locations within the immutable sequential listing, a plurality of locations within the immutable sequential listing, wherein each location of the plurality of locations contains the unique identifier.

7. The method of claim 6 further comprising:
   selecting a first location and a second location from the plurality of locations; and
   verifying a path in the immutable sequential listing from the first location to the second location.

8. The method of claim 6 further comprising retrieving at least a verification record from the index using the unique identifier, wherein the at least a verification record contains a past verification of a path between two locations containing the unique identifier in the immutable sequential listing.

9. The method of claim 1, wherein the at least a lot-specific record further comprises at least a sample entry.

10. The method of claim 1, wherein capturing at least a secondary datum describing the container further comprises capturing an optical code.

11. A system for cryptographic wireless detection and authentication of fluids, the system comprising a computing device configured to:
   receive, from a transmitter attached to a container, a unique identifier associated with a fluid contained in the container;
   locate, at an immutable sequential listing, at least an identifier-specific record using the unique identifier, and a lot identifier associated with the unique identifier;
   retrieve, from the immutable sequential listing, at least a lot-specific record using the lot identifier;
   capture, from the container, at least a secondary datum describing the container;
   generate an authenticity probability score as a function of the at least an identifier-specific record, the at least a lot-specific record, and the at least a secondary datum; and
   display to a user an output based on the authenticity probability score.

12. The system of claim 11, wherein the container further comprises a stopper, and the transmitter is contained within the stopper.

13. The system of claim 11, wherein the transmitter has a first mode in which the transmitter generates the unique identifier in a first form and a second mode in which the transmitter generates the unique identifier in a second form.

14. The system of claim 13, wherein the transmitter further comprises a tamper circuit, and wherein detachment of the transmitter from the tamper circuit causes the transmitter to transition from first mode to second mode.

15. The system of claim 13 wherein the computing device is further configured to:
   determine whether the unique identifier is in the first form or the second form; and
   identify a mode of first mode and second mode based on the determination.

16. The system of claim 11, wherein the computing device is further configured to locate the at least an identifier-specific record by retrieving, in an index linking unique identifiers to locations within the immutable sequential listing, a plurality of locations within the immutable sequential listing, wherein each location of the plurality of locations contains the unique identifier.

17. The system of claim 16 wherein the computing device is further configured to:
   select a first location and a second location from the plurality of locations; and
   verify a path in the immutable sequential listing from the first location to the second location.

18. The system of claim 16 wherein the computing device is further configured to retrieve at least a verification record from the index using the unique identifier, wherein the at least a verification record contains a past verification of a path between two locations containing the unique identifier in the immutable sequential listing.

19. The system of claim 11, wherein the at least a lot-specific record further comprises at least a sample entry.

20. The system of claim 11, wherein capturing at least a secondary datum describing the container further comprises capturing an optical code.

* * * * *